(12) United States Patent
Anand et al.

(10) Patent No.: US 10,815,603 B2
(45) Date of Patent: Oct. 27, 2020

(54) APPLIANCE HAVING A TOUCH FILM ON A COMPOUND CURVED SURFACE

(71) Applicant: WHIRLPOOL CORPORATION, Benton Harbor, MI (US)

(72) Inventors: Prabhjee Anand, Khandwa (IN); Timothy E. Heater, Hartford, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 267 days.

(21) Appl. No.: 15/928,226

(22) Filed: Mar. 22, 2018

(65) Prior Publication Data

US 2018/0209087 A1 Jul. 26, 2018

Related U.S. Application Data

(63) Continuation of application No. 15/199,189, filed on Jun. 30, 2016, now abandoned.

(51) Int. Cl.
| | |
|---|---|
| *D06F 37/28* | (2006.01) |
| *D06F 34/28* | (2020.01) |
| *D06F 33/00* | (2020.01) |
| *D06F 34/32* | (2020.01) |
| *D06F 34/34* | (2020.01) |
| *D06F 34/08* | (2020.01) |
| *D06F 39/14* | (2006.01) |
| *D06F 23/02* | (2006.01) |

(52) U.S. Cl.
CPC ............ *D06F 37/28* (2013.01); *D06F 23/02* (2013.01); *D06F 33/00* (2013.01); *D06F 34/08* (2020.02); *D06F 34/28* (2020.02); *D06F 34/32* (2020.02); *D06F 34/34* (2020.02); *D06F 39/14* (2013.01)

(58) Field of Classification Search
CPC .......... D06F 33/00; D06F 34/08; D06F 34/28; D06F 34/32; D06F 34/34; D06F 37/28; D06F 39/14; D06F 23/02
See application file for complete search history.

(56) References Cited

U.S. PATENT DOCUMENTS

| | | |
|---|---|---|
| 6,165,319 A | 12/2000 | Heath et al. |
| 8,006,687 B2 | 8/2011 | Watkins et al. |
| 8,567,976 B2 | 10/2013 | Hamlin et al. |
| 8,690,268 B2 | 4/2014 | Kang |

(Continued)

FOREIGN PATENT DOCUMENTS

| | | |
|---|---|---|
| CN | 103806252 A | 5/2014 |
| CN | 204298638 U | 4/2015 |

(Continued)

OTHER PUBLICATIONS http://www.rocklercom/j-roller-for-veneering, Item Specification for J-Roller for Veneering, Item #43174, accessed Jun. 30, 2016.

(Continued)

*Primary Examiner* — Joseph L. Perrin
(74) *Attorney, Agent, or Firm* — McGarry Bair PC

(57) ABSTRACT

An appliance having a door with an interior surface having a compound curvature, a section thereof configured to enable viewing a user interface on the interior surface through the door. The user interface includes a touch film adhered to the interior surface by application of a roller to activate a pressure sensitive adhesive between the touch film and the interior surface.

13 Claims, 12 Drawing Sheets

(56) References Cited

U.S. PATENT DOCUMENTS

| | | | |
|---|---|---|---|
| 8,826,701 | B2 | 9/2014 | Hong et al. |
| 8,857,490 | B2 | 10/2014 | Sung et al. |
| 8,976,158 | B2 | 3/2015 | Eriksson et al. |
| 2004/0156170 | A1* | 8/2004 | Mager ............... F24C 7/082 361/679.01 |
| 2004/0169449 | A1 | 9/2004 | Kim |
| 2007/0125475 | A1 | 6/2007 | Cecilio et al. |
| 2010/0103138 | A1 | 4/2010 | Huang et al. |
| 2010/0145483 | A1 | 6/2010 | McGonagle et al. |
| 2012/0036900 | A1 | 2/2012 | Hong et al. |
| 2012/0249467 | A1 | 10/2012 | Kotala et al. |
| 2013/0186151 | A1 | 7/2013 | Welch |
| 2014/0109622 | A1 | 4/2014 | Hwang |
| 2014/0138009 | A1 | 5/2014 | Lim et al. |
| 2014/0262002 | A1 | 9/2014 | Suwa et al. |
| 2015/0008807 | A1 | 1/2015 | Kim et al. |
| 2015/0153050 | A1 | 6/2015 | Eriksson et al. |
| 2015/0197077 | A1 | 7/2015 | Tsai et al. |
| 2016/0009025 | A1 | 1/2016 | Lee et al. |
| 2017/0121886 | A1* | 5/2017 | Kwon ............... D06F 37/304 |
| 2017/0121888 | A1* | 5/2017 | Kwon ............... G05B 19/10 |
| 2017/0121889 | A1* | 5/2017 | Kwon ............... D06F 34/28 |
| 2017/0121890 | A1* | 5/2017 | Kwon ............... D06F 37/10 |
| 2017/0121898 | A1* | 5/2017 | Kwon ............... D06F 58/20 |
| 2018/0349009 | A1* | 12/2018 | Breme ............... D06F 58/30 |
| 2019/0004690 | A1* | 1/2019 | Geyer ............... G06F 3/04886 |

FOREIGN PATENT DOCUMENTS

| | | |
|---|---|---|
| CN | 204551072 U | 8/2015 |
| CN | 303532435 | 12/2015 |
| CN | 204982424 U | 1/2016 |
| EP | 2837726 A1 | 2/2015 |
| EP | 2837727 A1 | 2/2015 |
| EP | 2837728 A1 | 2/2015 |
| EP | 2837729 A1 | 2/2015 |
| GB | 2022621 A | 12/1979 |
| KR | 19990066662 A | 8/1999 |
| KR | 100793763 B1 | 1/2008 |
| KR | 20150115054 A | 10/2015 |
| WO | 2011149319 A2 | 12/2011 |

OTHER PUBLICATIONS http://www.Ig.com/global/Igsignature/mobile/washingmachine. html, Product Information for LG Signature Washing Machine, accessed on Jun. 30, 2016.

https://www.amazon.com/MARSHALLTOWN-Premier-Line-E54D-Commercial/dp/B00011EFKM?ie=UTF8&dpID=31E4CYxrVL&dpSrc=sims&preST=_AC_UL160_SR160%2C160_&refRID=1YPNEM8SJSX137VSCJNV&ref_=pd_sim_328_8, Item Specification for MARSHALLTOWN The Premier Line E54D 2-Inch Flat Commercial Grade Solid Rubber Seam Roller with DuraSoft Handle, accessed Jun. 30, 2016.

Anonymous: "Sticky Buddy Compact: Amazon.DE: Kuche & Haushalt," Oct. 22, 2012, XP055404419, Retrieved From the Internet: URL: Https://Www.Amazon.De/Interhome-Sticky-Buddy-Compact/DP/B008RLZ608/Ref=SR_1_24?S=Kitchen&IE=UTF8&QID=1504710981&SR=1-24&Keywords=Fusselrolle, Retrieved on Sep. 6, 2017.

European Search Report for Counterpart EP17178236.0, Dated Sep. 25, 2017.

Amazon.com website: https://www.amazon.com/Speedball-Deluxe-Soft-Rubber-Brayer/dp/B0031FY622/ref=cm_cr_arp_d_bdcrb_top?ie=UTF8, "Speedball Deluxe Soft Rubber Brayer Roller", (Year: 2010).

Amazon.com website: Reviews for Speedball Deluxe Soft Rubber Brayer Roller. (Year: 2010).

\* cited by examiner

APPLIANCE HAVING A TOUCH FILM ON A COMPOUND CURVED SURFACE

CROSS REFERENCE TO RELATED APPLICATIONS

This application is a continuation of U.S. patent application Ser. No. 15/199,189, filed Jun. 30, 2016, which is hereby incorporated by reference in its entirety.

BACKGROUND

A domestic laundry appliance typically has a cabinet including a front panel with an access opening through which clothes are loaded and unloaded into a treating chamber. A door is movably mounted to the cabinet to selectively close the opening to the treating chamber. The door assembly usually consists of multiple layers of assembly to support various parts such as a transparent viewing window, a hinge assembly, and a latch assembly. Combining different parts of the door assembly may require the use of various mechanical fasteners.

BRIEF SUMMARY

One aspect of the invention relates to an appliance having a door with an interior surface having a compound curvature, and a section thereof configured to enable viewing a user interface on the interior surface through the door. The user interface includes a touch film adhered to the interior surface by application of a roller to activate a pressure sensitive adhesive between the touch film and the interior surface.

Another aspect of the invention is an appliance comprising a door with an inner door subassembly adhesively bonded to an intermediate door frame to form an intermediate door subassembly. A user interface controller affixed to the intermediate door frame wherein the inner door subassembly comprises an aperture for allowing selective access to the user interface controller. The door further comprising an outer door screen with an inner surface having a compound curvature, a section thereof configured to enable viewing a touch film on the inner surface through the outer door screen. The touch film is adhered to the inner surface by application of a roller to activate a pressure sensitive adhesive between the touch film and the inner surface.

DETAILED DESCRIPTION

Figure 1:
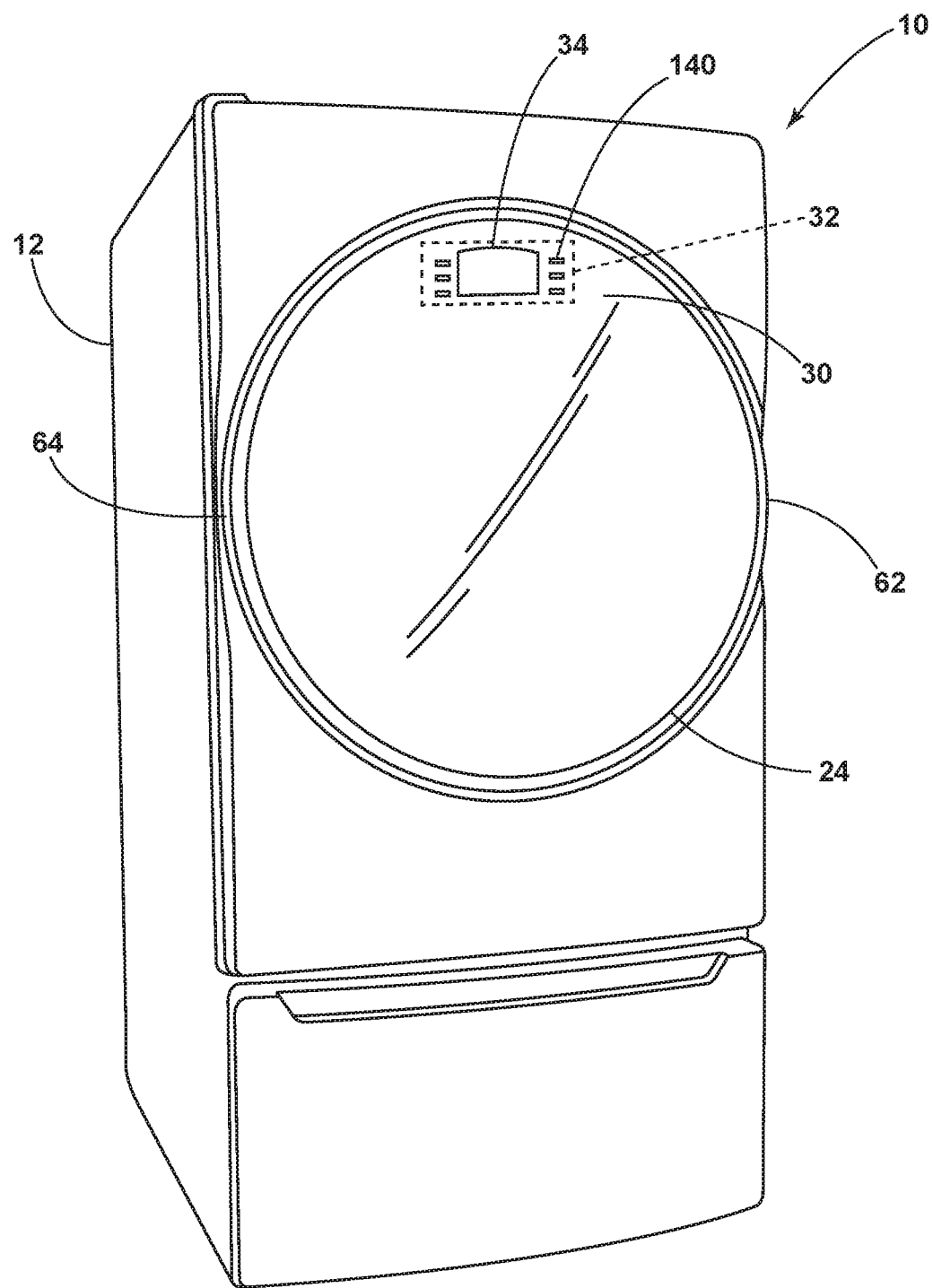
FIG. 1 is a perspective view of a horizontal axis automatic clothes washing machine incorporating aspects of the invention.
Figure 2:
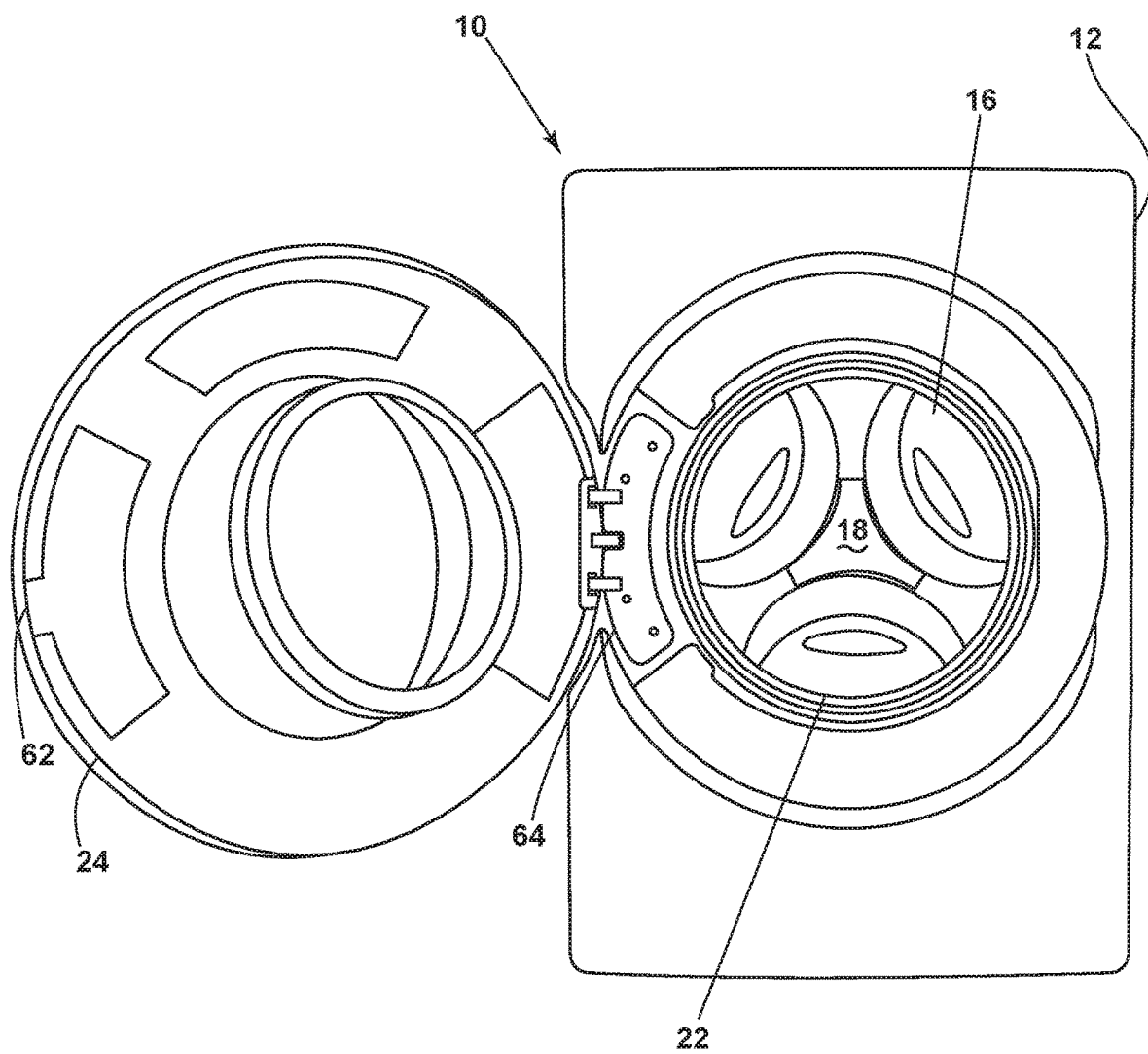
FIG. 2 is a front view of a portion of the horizontal axis automatic clothes washing machine of FIG. 1 with the door in an open position.

FIGS. 1 and 2 show views of a laundry treating appliance of the type incorporating aspects of the invention in the environment of a horizontal axis automatic clothes washing machine 10. Although much of the remainder of this application will focus on the embodiment of an automatic clothes washing machine, aspects of the invention may have utility in other environments, including other horizontal axis laundry treating appliances such as a laundry dryer or other front loading appliances. Depending on the configuration, it is possible for the embodiments to have applicability in vertical axis washing machines and other appliances having a hinged door with access to a treating chamber.

The laundry treating appliance shares many features of a conventional automated clothes washer and dryer, which will not be described in detail herein except as necessary for a complete understanding of the illustrative embodiments in accordance with the present disclosure. The laundry treating appliance of FIGS. 1 and 2 is illustrated as a horizontal axis washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system may include a rotatable drum 16 supported within the cabinet 12 by a suitable suspension system and defining at least a portion of a laundry treating chamber 18 for receiving the laundry and which rotates about a generally horizontal axis. The drum 16 is configured to receive a laundry load comprising articles for treatment, including, but not limited to, a hat, a scarf, a glove, a sweater, a blouse, a shirt, a pair of shorts, a dress, a sock, and a pair of pants, a shoe, an undergarment, and a jacket. An opening 22 in the cabinet 12 provides access to the laundry treating chamber 18.

The laundry holding system may further include a door 24 which may be movably mounted to the cabinet 12 to selectively close the opening 22 to the treating chamber 18. The door 24 has a handle 62 for pivotally opening the door about a hinge 64. The door 24 may further include an integrated user interface 30 comprising a touch film 140, a liquid crystal display 34, and a user interface controller 32. While the user interface 30 is illustrated as a touch control panel, the user interface can be any form of Human Machine Interface such as but not limited to a set of mechanical buttons or mechanical knobs for controlling the operation of the laundry treating appliance. FIG. 1 shows the door 24 in a closed position and FIG. 2 shows the door 24 in an open position. As shown in these figures, both front and rear surfaces of the door 24 have minimal visible fasteners as they are constructed with an adhesively bonded assembly process. In accordance with the present invention, the assembly of the door 24 will be described in detail with references to FIGS. 3 through 12.

Figure 3:
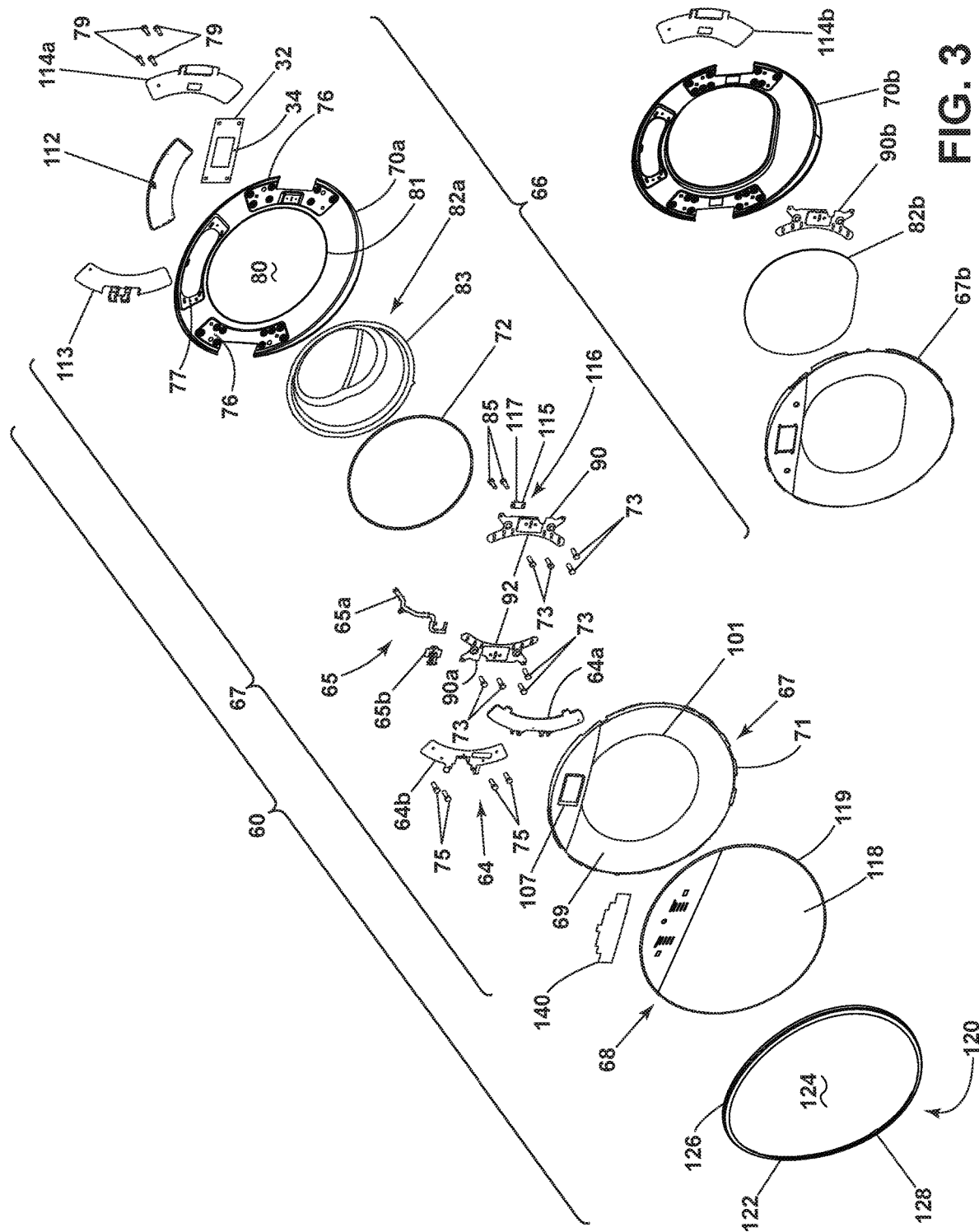
FIG. 3 is an exploded, perspective view of an assembly of the washing machine door of FIG. 2 with alternative parts for the application of a dryer door.
Figure 4:
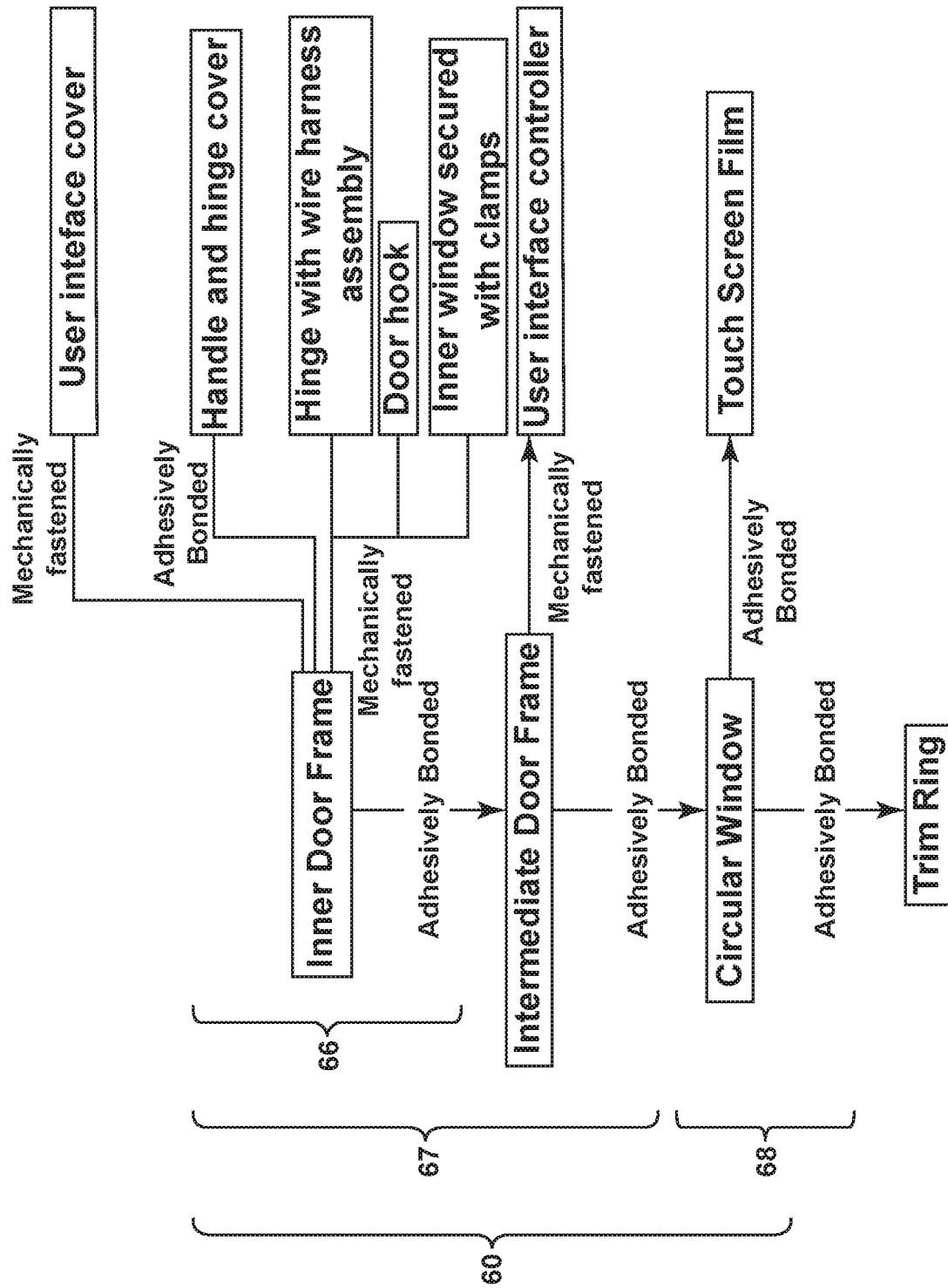
FIG. 4 is a flow chart depicting a method of assembling the laundry appliance door of FIGS. 2 and 3.

FIG. 3 is an exploded perspective view of an assembly 60 for the door 24 along with alternative parts for a dryer door assembly according to an embodiment of the present invention. It should be noted that majority of these parts are interchangeable for both washer and dryer door assembly. The present invention is not in any way limited to the specific details of these variations. The purpose of these alternative parts is to show the flexibility of design to achieve a specific utility while still maintaining the ease of assembly and minimal visible fasteners. A method of assembling the door assembly 60 in FIG. 3 is broken down into several steps as illustrated in FIG. 4.

In FIG. 3, the door assembly 60 is shown to comprise an inner door subassembly 66, an intermediate door subassembly 67, and an outer door screen 68.

Figure 5:
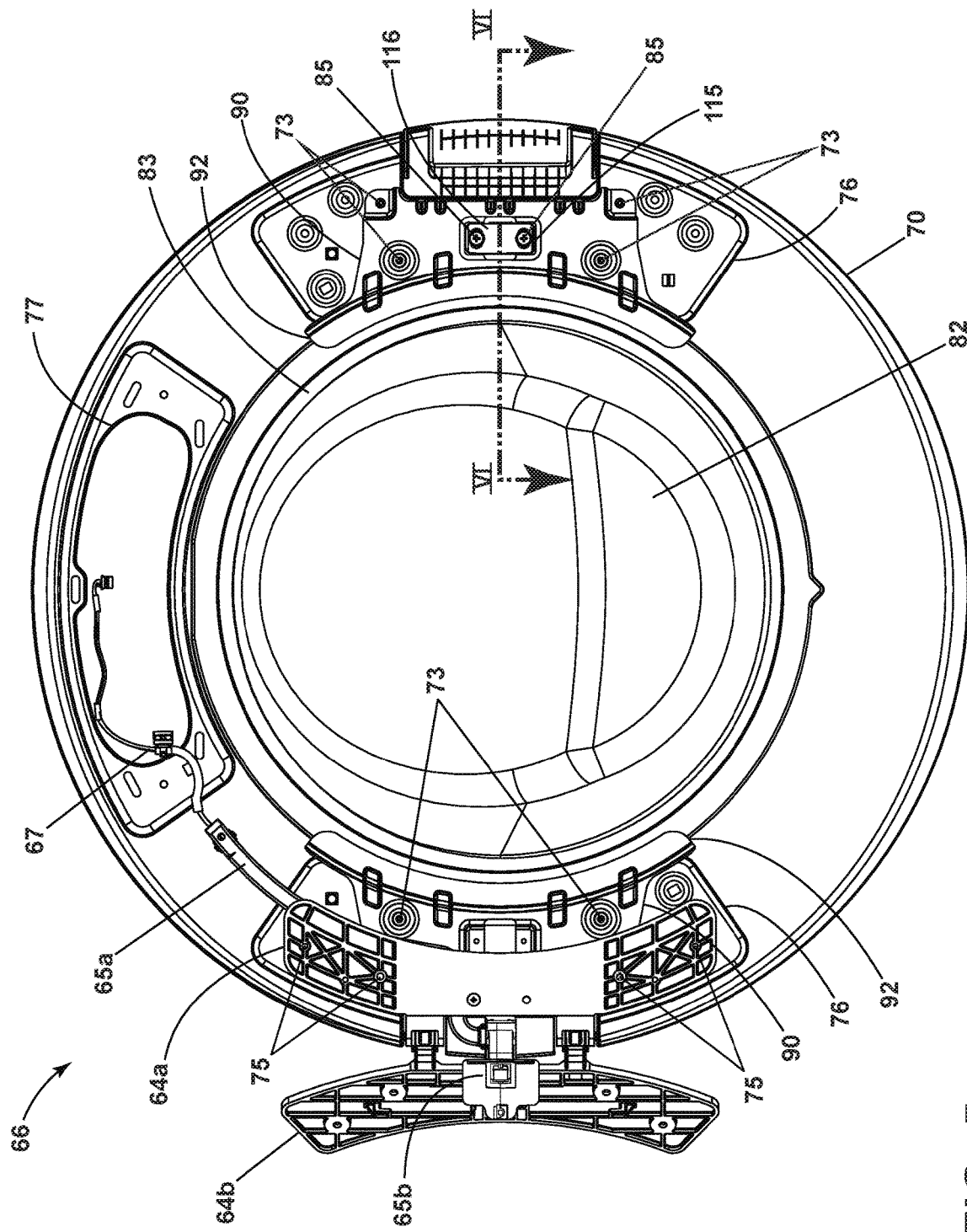
FIG. 5 is a front view of an inner door assembly of FIG. 3.
Figure 6:
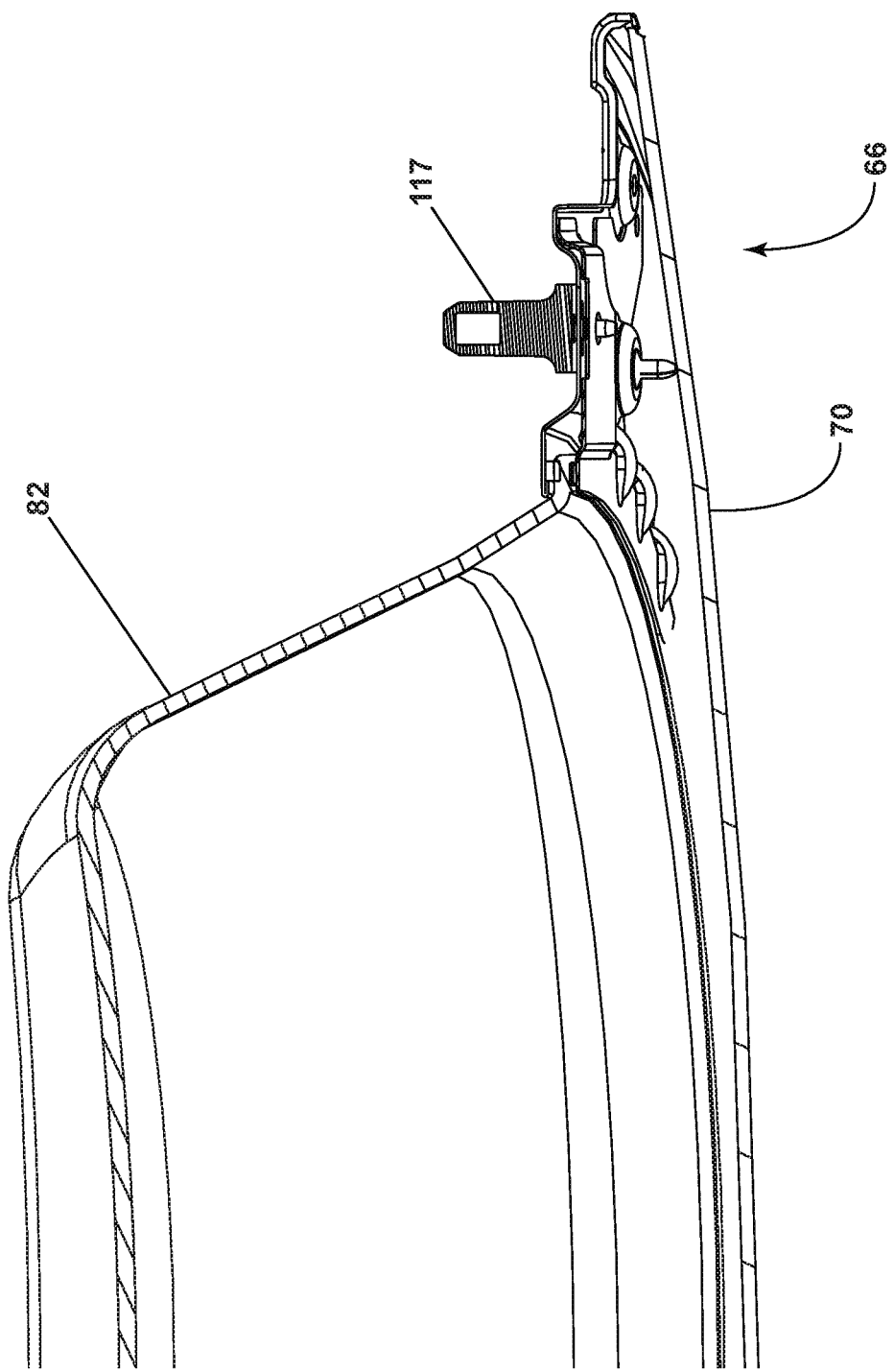
FIG. 6 is a horizontal cross section of the inner door assembly of FIG. 5

FIGS. 3, 5 and 6 illustrate the inner door subassembly 66. The inner door subassembly 66 comprises an inner door frame 70a. The inner door frame 70a is made from steel or stainless steel material. The inner door frame 70a comprises a first central opening 81 that defines a circular window seat portion 80. The inner door frame 70a further comprises two identical horizontally disposed or alternate hinge seat portions 76 and an aperture 77 on the upper portion of the inner door frame 70a to allow access to a user interface controller 32. The identical hinge seat portions 76 are designed for ease of assembly of a door with inverse hinge position. As shown in FIG. 3 an alternative variance to the inner door frame 70b for a laundry dryer is shown. Minor differences such as the hinge seat portions and central opening of the dryer inner door frame 70b are designed to accommodate the variation of door latches and window unit to be used to meet a specific utility.

The inner door subassembly 66 further comprises an inner window 82a and b. The inner window 82a may be a plastic bowl piece which is circular in shape. In alternative embodiments such as in the application for a dryer door assembly, the inner window 82b may be constructed of a glass material with a flat structure. As shown in FIGS. 3 and 5, the inner window 82a has a bowl shape structure configured in such a way that its lower portion protrudes into the drum. The inner window 82a comprises a peripheral flange 83 that is adapted to overlay the circular window seat portion 80 of the inner door frame 70a. The inner window 82a is adapted to be seated within the window seat portion 80 of the inner door frame 70a so as to extend across the first central opening 81. A gasket 72 is attached to the inner door frame 70a using adhesives. The gasket 72 is utilized to create a waterproof seal and reduce sound generated from the point of contact between the peripheral flange 83 of the inner window 82a and the circular window seat portion 80 of the inner door frame 70a.

Continuing with FIGS. 3 and 5, the inner door assembly 66 further comprises two glass clamps 90a that are mechanically fastened to the inner door frame 70a with screws 73 to lock the inner window 82a in place in the window seat portion 80. The variation of glass clamps 90b for laundry dryer shown in FIG. 3 is designed to accommodate the varying diameter of the inner window 82b for the inner door assembly. Each of the glass clamps 90a has a collar 92 that is adapted to overlay the peripheral flange 83 of the inner window 82a. When the glass clamps 90a are secured to the inner door frame 70a, the collar 92 of each glass clamp 90a exerts pressure on the peripheral flange 83 of the inner window 82a and locks the inner window 82a in place in the window seat portion 80. As the glass clamps 90a are secured to the two horizontally disposed or alternate hinge seat portions 76 on the inner door frame 70a, each glass clamp 90a can be used interchangeably with the other to secure the inner window 82a to the inner door frame 70a. In an alternative embodiment, the inner window 82a and b may be adhesively bonded to the receiving element within the inner door subassembly 66. In this configuration, an adhesively bonded inner window 82a and b will eliminate the need for a gasket 72 and clamps 90a and b to secure the inner window 82a and b. Referring now to FIGS. 3, 5 and 6, the inner door subassembly 66 further comprises a hinge 64 and a door hook 116. The hinge 64 comprises of two symmetrical hinge plates 64a, 64b pivotable relative to each other about a hinge axis. The hinge plate 64a is secured to the inner door frame 70a by screws 75 that thread into the openings in the hinge plate 64a and through corresponding openings in the hinge seat portions 76 of the inner door frame 70a overlaying one of the glass clamps 90a. The hinge plate 64a can be secured in either one of the horizontally disposed hinged seat portions 76 of the inner door support frame 70a depending on the door configuration to open either from the left or right side. In an alternative embodiment, the hinge plate 64a may be adhesively bonded to the hinged seat portions 76. The hinge 64 further includes a wiring harness 65 comprising a tubular wiring protector 65a and a wiring base 65b coaxially connected together and rotatable with respect to one another. In FIG. 5, the hinge 64 with integrated wiring harness 65 fastened to the inner door frame 70a is shown. The tubular wiring protector 65a is fixed on the hinge plate 64a, and hinge wiring base 65b fixed on hinge plate 64b, with a portion of the tubular wiring protector 65a inserted into a port of the wiring base 65b to coaxially connect the tubular wiring protector 65a and wiring base 65b independently of the hinge plates 64a and 64b, yet within alignment of the hinge 64 axis of rotation. A wiring assembly (not shown) passes through the tubular wiring protector 65a and the hinge wiring base 65b to protect the wiring assembly within the hinge axis of the hinge 64 where wiring has a tendency to get pulled and damaged when the door 24 is in motion. The hinge 64 and wiring harness 65 may be used in both washer and dryer door assembly. It is within the scope of an embodiment to adhere the peripheral flange 83 to the inner door frame 70a, thereby possibly omitting a need for the glass clamps 90 in the inner door subassembly 66.

Looking again also at FIG. 6, the door hook 116 comprises a rectangular plate 115 and a hanging portion 117 with an inclined surface to guide insertion of the hook 116 in and out of a latch body (not shown) attached to a front panel in the cabinet 12 of the laundry treating appliance. As seen in FIGS. 5 and 6, the door hook 116 is mechanically fastened by screws 85 that pass through the openings in the rectangular plate 115 and into corresponding openings in the other one of the horizontally disposed hinged seat portions 76 of the inner door frame 70a. The hanging portion 117 passes through the front of the inner door frame 70 and protrudes from the rear face of the inner door frame 70a.

Figure 7:
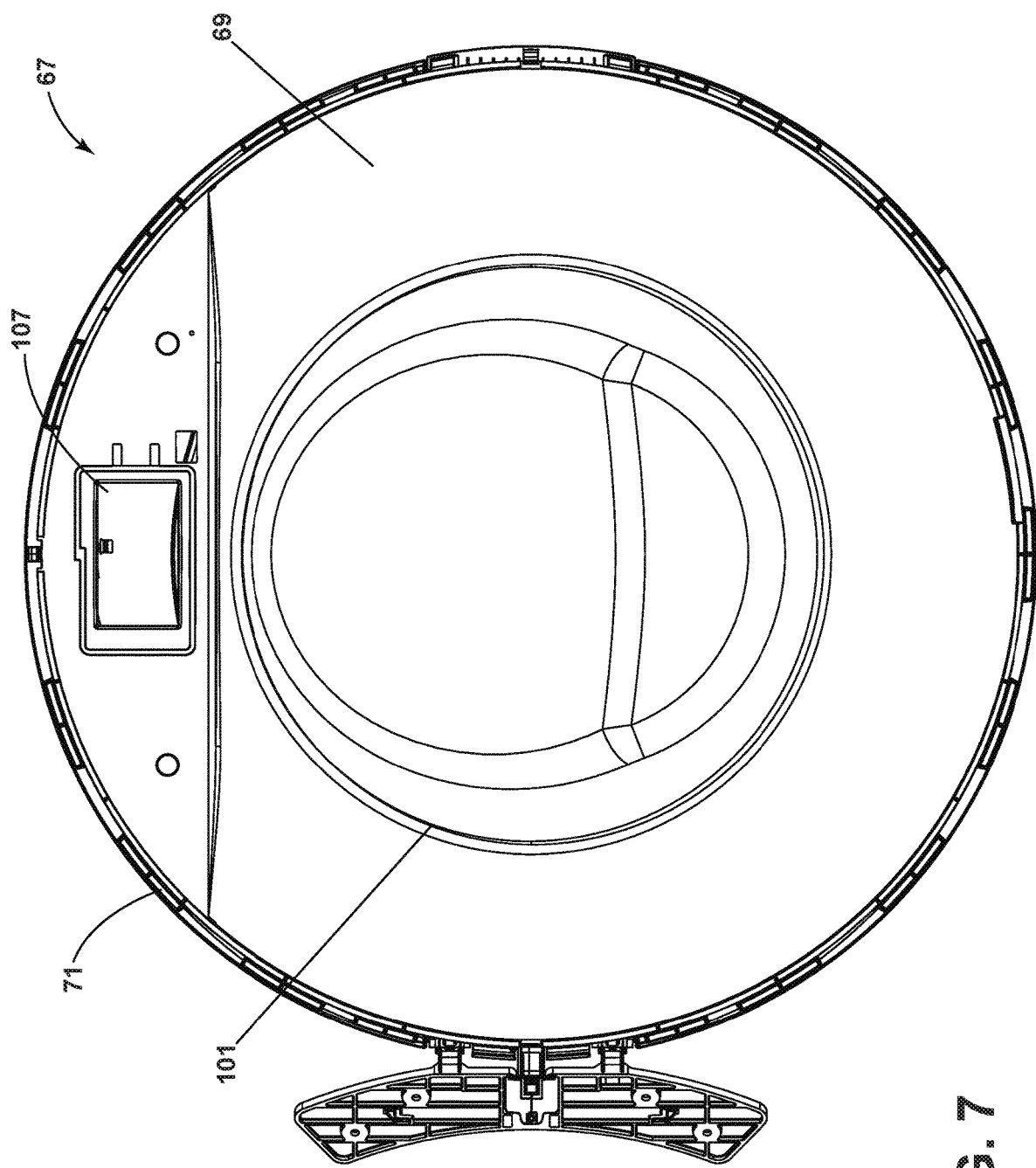
FIG. 7 is a front view of an intermediate door assembly with an intermediate door frame bonded to the inner door assembly of FIG. 5.
Figure 8:
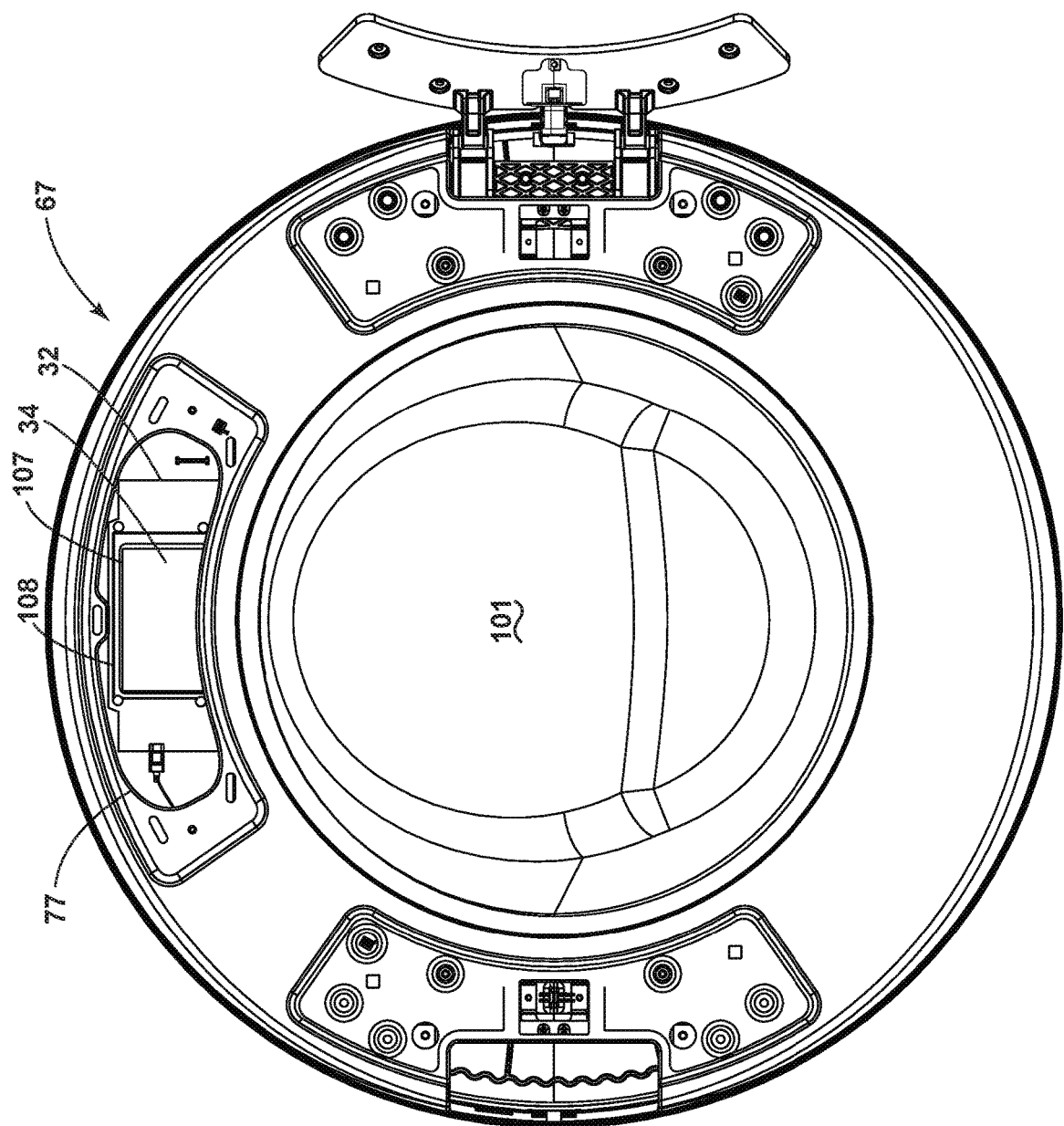
FIG. 8 is a rear view of the intermediate door assembly of FIG. 7.

The intermediate door subassembly 67 is shown in FIGS. 3, 7 and 8. The intermediate door subassembly 67 comprises a single piece injection molded intermediate door frame 69a adhered to the front face of the inner door subassembly 66. Variance of the intermediate door frame 69b shown in FIG.

3 reflects the difference in the size and shape of the central opening that is customizable to match the dimension of the inner door subassembly 66. Front and rear views of the intermediate door subassembly 67 adhered to the inner door subassembly 66 are illustrated in FIGS. 7 and 8, respectively. The intermediate door frame 69 comprises a second central opening 101 overlaying the first central opening 81 and a smaller rectangular aperture 107 overlaying the aperture 77 on the upper portion of the inner door frame 70a. The intermediate door frame 69 is surrounded by peripheral shelf like ridges 71 extending radially from the circumference of the intermediate door frame 69.

In the present embodiment, the smaller rectangular aperture 107 in the intermediate door frame 69 is sized to fit a liquid crystal display 34 embedded with the user interface controller 32. Additional openings and wiring paths within the intermediate door frame 69 may be added to accommodate additional wiring from devices or sensors such as but not limited to a wifi receiver or a proximity sensor integrated to the door assembly 60. As shown in FIG. 8, the smaller rectangular aperture 107 can be seen through the aperture 77 of the inner door frame 70a along with a user interface controller seating portion 108. The user interface controller 32 can be mechanically fastened to the seating portion 108 through the aperture 77 with screws 79 and exposing the liquid crystal display 34 through the smaller rectangular aperture 107. The wiring assembly extending from the tubular wiring protector 65a of the wiring harness assembly 65 can be connected to the back of the user interface controller 32 once secured to the seating portion 108.

Figure 9:
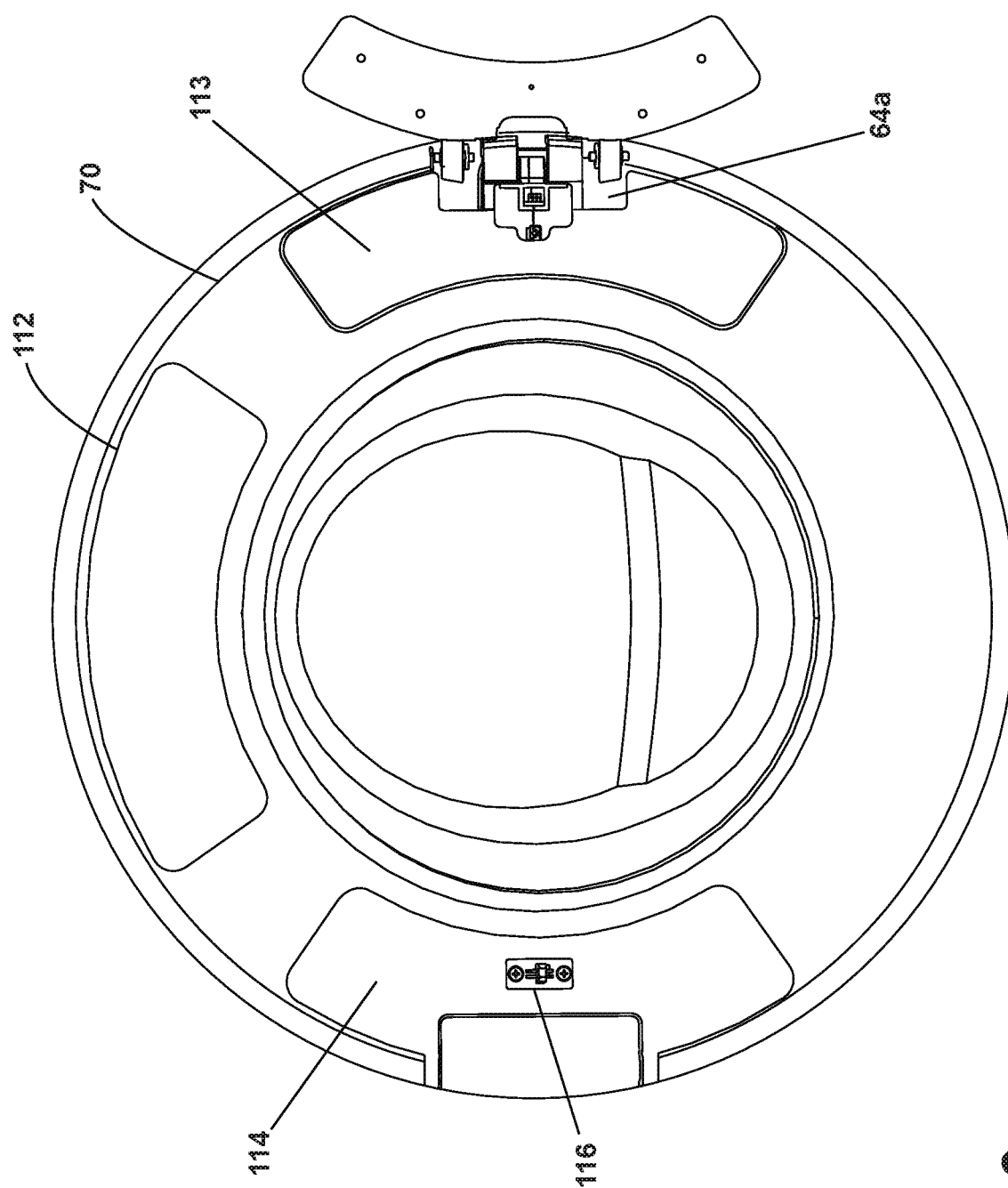
FIG. 9 is a rear view of the intermediate door assembly with hinge and handle covers adhesively attached to the inner door frame hiding any visible mechanical fasteners.

As shown in FIG. 9, a user interface cover 112, a hinge cover 113, and a handle cover 114 are used to cover the mechanical fasteners 73, 75, 85, and 79 on the rear face of the inner door frame 70a to provide the intermediate door subassembly 67 with a clean finish. The user interface cover plate 112 is removably attached, such as by snap fit, to the rear face of the inner door frame 70a to cover the aperture 77 where the back of the user interface controller 32 is exposed. This also allows ease of access for the purpose of maintenance or replacement of the user interface controller 32. The hinge cover 113 is adhesively bonded to the rear face of the inner door frame 70a to cover the exposed mechanical fasteners 73 and 75 on the hinge seat portion 76 where the hinge plate 64a and clamps 90a are secured. The handle cover 114 is adhesively bonded to the rear face of the inner door frame 70a to cover the exposed mechanical fasteners 73 and 85 on the hinge seat portion 76 where the clamps 90a and door hook 116 are secured.

Figure 10:
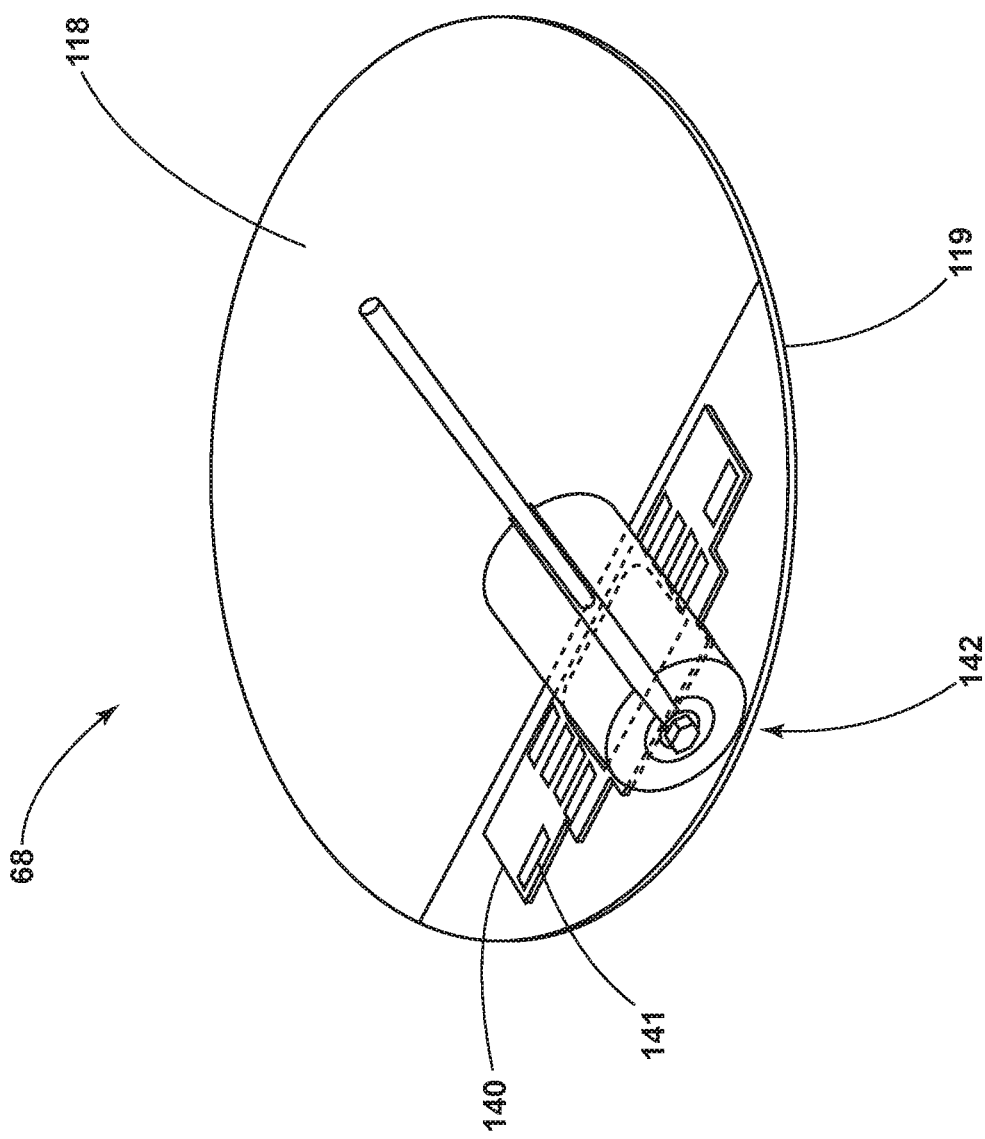
FIG. 10 is a perspective view depicting the application of a touch film with a roller apparatus of low durometer.

The door assembly 60 further includes an outer door screen 68 shown best in FIGS. 3 and 10. The outer door screen 68 comprises a circular window 118 with a slight outwardly convex central portion surrounded by peripheral ring-like flange 119. The circular window 118 may be made of a transparent plastic material. As seen in FIG. 10, the outer door screen 68 further comprises a touch film 140 attached to the upper inner surface of the circular window 118. The touch film 140 comprises an integrated flexible printed circuit board with touch buttons 141 and a pressure sensitive adhesive located on a facing surface of the touch film 140.

To attach the film 140, the facing surface of the touch film 140 is placed against the upper rear surface of the circular window 118 and uniform pressure is applied by rolling a roller apparatus 142 over the touch film 140 with enough pressure to activate the pressure sensitive adhesive.

Figure 11:
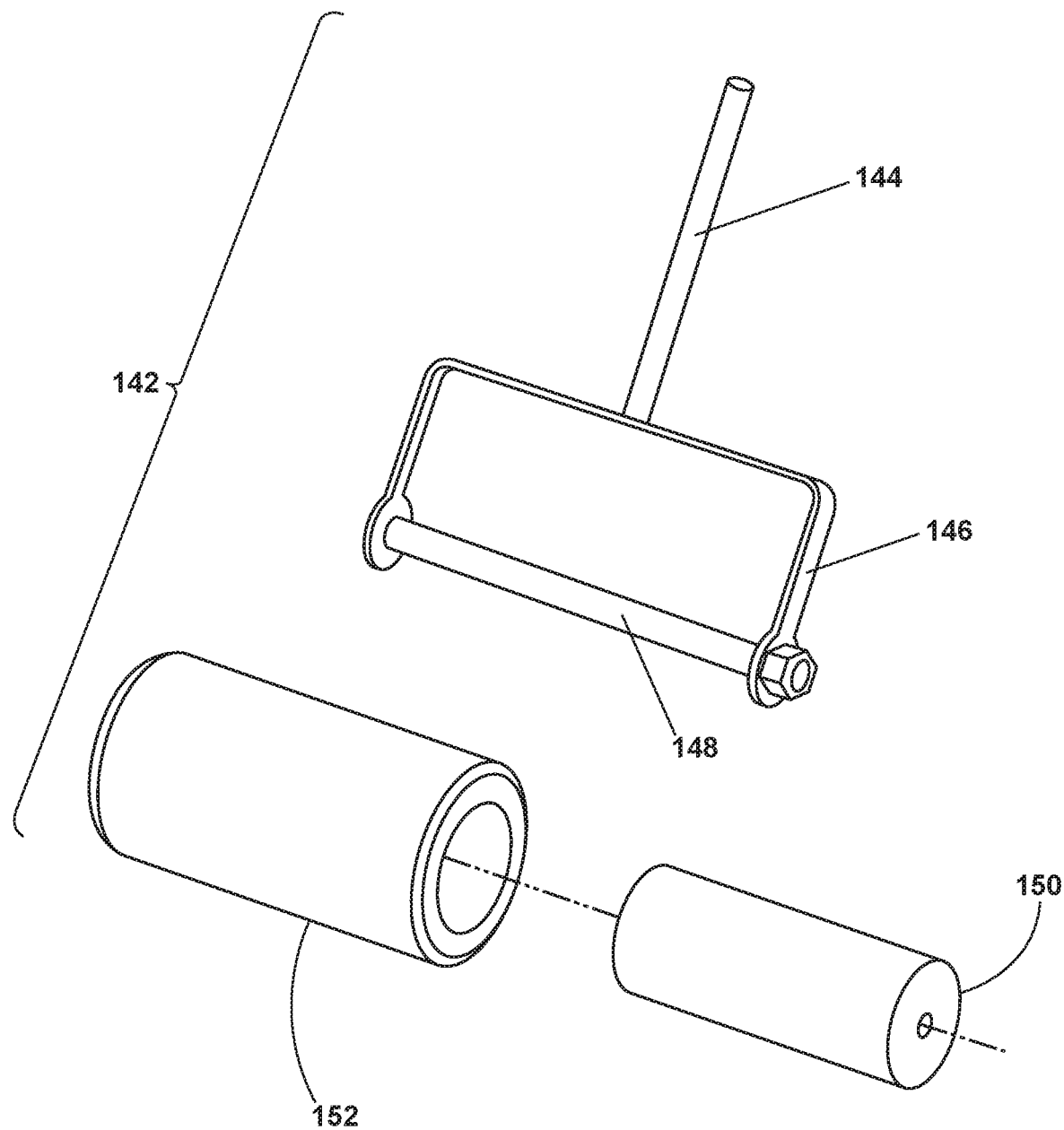
FIG. 11 is an exploded, perspective view of the roller assembly.

As shown in FIG. 11, the roller comprises a handle 144 with a pair of forked arms 146 at a distal end, an axle 148 extending between the forked arms and a hub 150 disposed on the axle. The roller apparatus 142 has an exterior layer 152 of low durometer material disposed on the hub 150 with enough flexibility to conform to the compound curvature of the circular window 118, enough strength to activate the pressure sensitive adhesive, while also minimizing damage to components on the touch film 140. The durometer of the exterior layer 152 is preferably in the range of 28 A to 40 A, according to the ASTM D2240 standard. The roller apparatus 142 is wider than the touch film 140 so that the rolling process can be done in a single pass to ensure uniform adhesion and to retain proper function of the touch screen.

To complete the outer door screen 68, a button indicator film (not shown) that corresponds to the touch buttons 141 on the touch film 140 may be attached to the outer surface of the circular window 118 overlaying the position of the touch film 140 to improve visibility. A final protective film is then used to coat the overall outer surface of the circular window 118 for a smooth and clean surface appearance.

Figure 12:
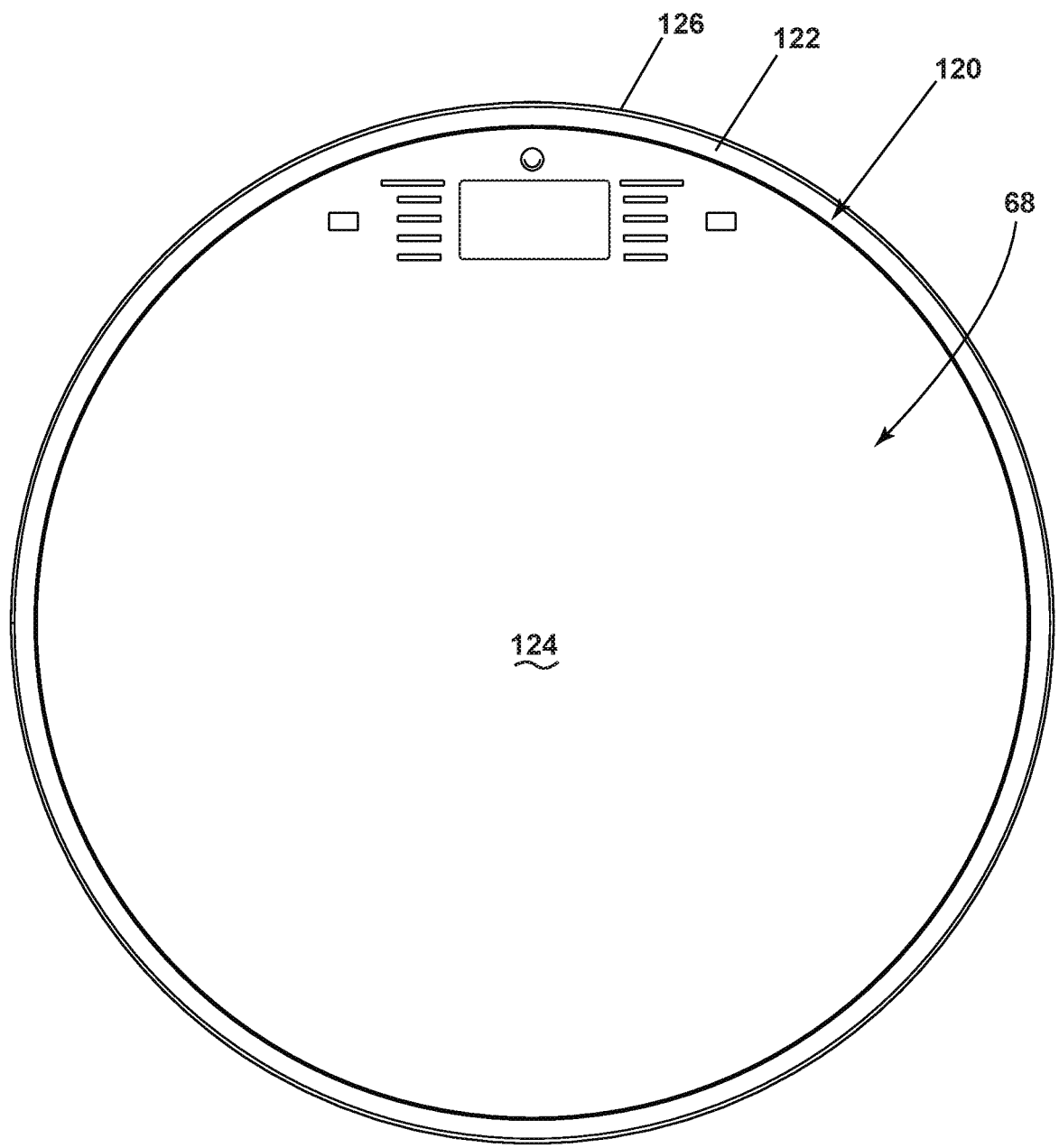
FIG. 12 is a front view of the completed door assembly with a trim ring adhesively bonded to the peripheral edge of the outer door screen and intermediate door frame.

Referring now to FIG. 12, the inner surface of the outer door screen 68 is adhesively attached to the external surface of the intermediate door frame 69 of the intermediate door subassembly 67. A trim ring 120 may be adhesively bonded to the external periphery of the door assembly 60. The trim ring 120 is in the form of a peripheral flange 122 comprising a ring flange with a central opening 124. When bonding the trim ring 120 to the door assembly 60, the peripheral ring-like flange 119 of the circular window 118 is nested and adhesively bonded into the peripheral flange 122 of the trim ring 120. The trim ring 120 also has a rim 126 that extends axially from the external circumference of the peripheral flange 122. The inner periphery of the rim 126 is provided with an alternating shelf like ridges 128 that match the peripheral shelf like ridges 71 of the intermediate door frame 69 (see FIG. 3). When bonding the trim ring 120 to the door assembly 60, the matching shelf like ridges 128 and 71 will create a stronger adhesive bond. This completes the door assembly 60 with a smooth finish. In an alternative embodiment, the trim ring 120 can be integrated to the outer door screen 68 into a single subassembly.

FIG. 4 depicts a method and preferred order of making the door assembly 60. The method includes assembling the inner door subassembly 66, adhering an intermediate door frame 69 to the inner door subassembly 66 with glue to form the intermediate door subassembly 67, affixing a user interface controller 32 to the intermediate door frame 69 through an aperture 77 in the inner door subassembly 66, applying the touch film 140 to an inner surface of the outer door screen 68 with an adhesive, and adhering the inner surface of the outer door screen 68 to the intermediate door subassembly 67 with glue.

The assembly of the inner door subassembly 66 begins with adhesively attaching the gasket 72 to the peripheral window seat portion 80 with glue and aligning the inner window 82a to seat within the window seat portion 80 so as to extend across the first central opening 81. In this position, the peripheral flange 83 of the inner window 82a will be overlaying the gasket 72 to create a waterproof connection. As shown in FIG. 5, clamps 90a are mechanically fastened to the hinge seat portion 76 of the inner door frame 70a with screws to apply a locking pressure to the peripheral flange 83 of the inner window through the clamp collars 92. To complete the inner door subassembly 66, the hinge 64 with integrated wiring harness 65 and the door hook 116 are mechanically fastened to each of the hinge seat portion 76 of the inner door frame 70a overlaying each of the clamps 90a. The hinge cover 113 and handle cover 114 are adhesively attached to cover the visible fasteners 73, 75, 85, and 79 on the rear face of the inner door assembly 66.

As shown in FIGS. 7 and 8, the intermediate door frame 69 is then adhered to the front surface of the inner door subassembly 66 with glue to form the intermediate door subassembly. The user interface controller 32 can be fastened to the seating portion 108 on the rear face of the intermediate door frame 67 through the aperture 77 (see FIG. 8) with screws 79. This will also expose the liquid crystal display 34 through the smaller rectangular aperture 107 of the intermediate door frame 69.

Referring to FIGS. 10 and 11, the touch film 140 is attached to the upper inner surface of the circular window 118 with the roller apparatus 142 as part of the user interface 30 (see FIG. 1). To complete the door assembly 60, the inner surface of the outer door screen 68 is adhesively attached to the external surface of the intermediate door frame 69 of the intermediate door subassembly 67. The trim ring 120 is then adhesively bonded to the external periphery of the door assembly 60 to create a smooth finish. The user interface cover 112 can be removably attached to the rear face of the inner door assembly 66 to cover the exposed user interface controller 32 after the necessary wiring connections have been established. In an alternative embodiment, the user interface controller 32 can be integrated to the user interface cover 112 to eliminate a separate assembly steps and still allow easy access to the user interface controller 32. The touch film 140 may comprise a PCB adhered to the circular window 118 to provide the user interface function. The trim ring 120 may be incorporated with the outer door screen 68 as part of a full A-surface decoration.

The adhesively bonded assembly process hides all visible mechanical fasteners 73, 75, 85, and 79 on the external surface of the door assembly 60 and creates an aesthetically smooth appearance. By adhesively bonding the single piece injection molded intermediate door frame 69 to the front of the inner door subassembly 66, mechanical fasteners 73, 75 used to mount the hinge plate 64a and glass clamps 90a are hidden from the front view (see FIG. 7). Furthermore, by adhesively bonding the handle cover 144 and hinge cover 113 to the back of the inner door frame 70a, all mechanical fasteners 73, 75, 85, and 79 visible on the back of the door assembly 60 are hidden from view (see FIG. 9).

The front surface of the intermediate door frame 69 also facilitates a bonding surface for adhesively attaching the outer door screen 68 to the intermediate door subassembly 67 without the use of mechanical fasteners. The apertures 77 and 107 from the intermediate door subassembly 67 along with the wiring harness assembly 65 enable an effective integration of the user interface 30 into the door assembly 60. Furthermore, the removable user interface cover plate 112 allow ease of access to the user interface controller 32 while maintaining an aesthetically smooth appearance. The circular window 118 can be combined with the intermediate door frame 69, utilizing a full A-surface decoration for the circular window 118, thus creating both the user interface as well as a structure to mount the HMI controller, and bonded interface detail with the inner door subassembly 66. As well, the inner door frame 70a may include component interface details common for both washer and dryer door interfaces, thus permitting re-use of hinge 64 and wiring harness 65 between the washer and dryer doors. It will be understood that the inner door frame 70a may be made common for washer and dryer door assemblies. Further, the circular window 118 and the user interface controller 32 can be configured to support the use of a mechanical knob for cycle selection and/or mechanical buttons. Yet further, a WI-FI antenna may be mounted into the door assembly 60.

Although the embodiment of the present invention have been shown and described, it would be appreciated by those skilled in the art that changes may be made in these embodiments without departing from the principles and spirit of the invention, the scope of which is defined in the claims and their equivalents.

What is claimed is:

1. A laundry treating appliance comprising:
an inner door subassembly comprising at least an inner door frame, an intermediate door frame attached to the inner door frame, an outer door screen attached to the intermediate door frame, the intermediate door frame being adhered to a front of the inner door frame; the inner door frame having a front and a back with at least one hinge seat;
at least two spaced mechanical fasteners extending from the front to the back of the inner door frame for mounting a hinge within the hinge seat;
a hinge cover having a shape complimentary to the hinge seat and adhesively bonded to the inner door frame to cover the mechanical fasteners on the back of the inner door frame;
a user interface controller being affixed to the intermediate door frame through an aperture in the inner door frame;
a touch film having an integrated flexible printed circuit board with touch buttons in communication with and configured to control the user interface controller;
the outer door screen comprising an interior surface and an outer surface and having a compound curvature, a section thereof configured to enable viewing of the touch firm positioned on the interior surface of the outer door screen; and
a pressure sensitive adhesive configured to adhere the touch film to the interior surface of the outer screen door.

2. The laundry treating appliance of claim 1 wherein the inner door assembly further comprises mechanical fasteners for assembling the inner door assembly.

3. The laundry treating appliance of claim 2 further comprising a handle cover to hide the mechanical fasteners.

4. The laundry treating appliance of claim 1 further comprising covers configured to hide the mechanical fasteners on the inner door subassembly.

5. The laundry treating appliance of claim 4 wherein the covers are adhesively bonded to the inner door subassembly.

6. The laundry treating appliance of claim 5 further comprising a peripheral flange adhered to the intermediate door frame.

7. The laundry treating appliance of claim 6 wherein the pressure sensitive adhesive is applied to the touch film before the touch film is adhered to the interior surface of the outer screen door.

8. A laundry treating appliance comprising:
an inner door subassembly comprising at least an inner door frame, an intermediate door frame attached to the inner door frame, an outer screen door attached to the intermediate door frame; the inner door frame having a front and back with at least one handle seat;
at least two spaced mechanical fasteners extending from the front to the back of the inner door frame for mounting a handle within the handle seat;
a handle cover having a shape complimentary to the handle seat and adhesively bonded to the inner door frame to cover the mechanical fasteners on the back of the inner door frame; wherein the intermediate door frame is adhered to the front of the inner door frame and covers the at least two mechanical fasteners on the front of the door frame;

a user interface controller being affixed to the intermediate door frame through an aperture in the inner door frame;

a touch film having an integrated flexible printed circuit board with touch buttons in communication with and configured to control the user interface controller;

the outer door screen comprising an interior surface and an outer surface and having a compound curvature, a section thereof configured to enable viewing of the touch firm positioned on the interior surface of the outer door screen; and a pressure sensitive adhesive configured to adhere the touch film to the interior surface of the outer screen door.

9. The laundry treating appliance of claim 8 wherein the pressure sensitive adhesive is applied to the touch film before the touch film is adhered to the interior surface of the outer screen door.

10. The laundry treating appliance of claim 8 further comprising a peripheral flange adhered to the intermediate door frame.

11. The laundry treating appliance of claim 8 further comprising a hinge seat on the back of the inner door frame.

12. The laundry treating appliance of claim 11 further comprising at least two spaced mechanical fasteners extending from the front to the back of the inner door frame for mounting a hinge within the hinge seat.

13. The laundry treating appliance of claim 12 further comprising a hinge cover having a shape complimentary to the hinge seat and adhesively bonded to the inner door frame to cover the mechanical fasteners on the back of the inner door frame.

* * * * *